Nov. 5, 1968   JUN SHIMOMURA   3,409,378

MULTI-ELEMENT EXPOSURE METER

Filed Dec. 23, 1964

INVENTOR.
JUN SHIMOMURA
BY
ATTORNEY.

United States Patent Office

3,409,378
Patented Nov. 5, 1968

3,409,378
MULTI-ELEMENT EXPOSURE METER
Jun Shimomura, Setagaya-ku, Tokyo, Japan, assignor to Nippon Kogaku K.K., Tokyo, Japan, a corporation of Japan
Filed Dec. 23, 1964, Ser. No. 420,615
Claims priority, application Japan, Dec. 28, 1963, 38/70,522
3 Claims. (Cl. 356—222)

ABSTRACT OF THE DISCLOSURE

The invention provides a multi-element exposure meter in which the light receiving surface is divided into more than two light receiving elements connected in series for determining the exposure indication on the basis of the dark portions of the scene to be photographed.

---

The invention relates to an electrical exposure meter device of the reflected light type.

Devices of this type are known. In those devices mean brightness of the scene to be photographed is measured by receiving on the light receiving surface the reflected light from the scene to be photographed regardless of the size of the light receiving angle. The exposure is given by adjusting exposure control elements in response to the measured mean brightness. In considering this mean brightness, the density, i.e. light and shade, reproduced on a negative film would be proper when the scene to be photographed is flat with little contrast. However, it is well-known that when the scene to be photographed has a significant contrast the exposure value given in accordance with the indication of the exposure meter would tend to represent an erroneous exposure. To correct this error, various methods have been proposed. Among those, there was a method to correct the indicated value of the electrical exposure meter in consideration of the area ratio of black and white portions of the scene to be photographed. Other methods adapted to the most exposure meters were to provide, if necessary, a device for increasing or decreasing by one or more steps the indicated value of the exposure meter or to provide marks on the exposure meter indicative of under-mark, over-mark, fine weather mark and cloudy weather mark, etc. In fact, in case of an extreme brightness distribution of the scene to be photographed, for example, phototaking under snow or counter light condition, the amount to be corrected required more than one or two steps. It is very difficult to correctly determine the amount of rectification even for a well-experienced photographer.

In accordance with the invention, the above mentioned rectification is automatically made with an extremely simple means.

The principal object of the invention is to provide an improved exposure meter in which the photoconductive surface of the exposure meter possesses the location where the distribution of the intensity of illumination substantially corresponds to the brightness distribution of every portion of the scene to be photographed, the photoconductive surface being divided into more than two light receiving elements which are connected in series to each other, whereby the exposure indication is set on the basis of the dark portion of the scene to be photographed.

Other objects, advantages and features of this invention will become more apparent from the following description in conjunction with the drawing in which:

FIGS. 7 and 8 show the constructions of the photoconductive cell according to the prior art in which FIG. 7 is an elevational view of the sintered type element while FIG. 8 is a sectional view of the film type element;

Figure 1:
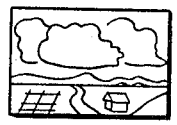
FIGS. 1 through 6 are explanatory sketches showing brightness distribution.
Figure 2:
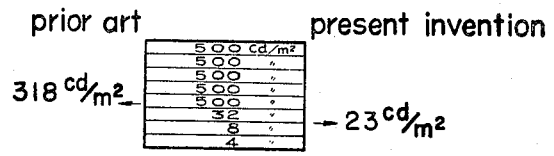

Considering first the indicating value when photometry is made with the exposure meter of the reflected light type. For example, FIG. 1 discloses a light scene of the sky and clouds which possesses more than one half of the picture, a midtone scene of the far and middle distant views and a relatively dark scene of the near distant view. When the picture of FIG. 1 is represented by the brightness grade of light and dark as shown in FIG. 2, the exposure meter according to the prior art indicates the mean value of the products multiplying respective brightness values by the corresponding areas (in strict sense, each area should be substituted by a solid angle of each portion of the scene to be photographed with respect to the light receiving element of the exposure meter). This mean value is represented with reference to FIG. 2 by $$\frac{(500 \times 5) + (32 \times 1) + (8 \times 1) + (4 \times 1)}{8} = 318 \text{ cd./m.}^2$$

When the exposure is set on the basis of this value, the middle and near views will be underexposed.

Figure 3:
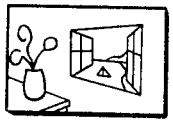
Figure 5:

The scene to be photographed under backlighting conditions as shown in FIG. 3 represents a bright portion of significantly high value in spite of the fact that the dark portion occupies a relatively large area, and consequently the indicating mean value of the exposure meter has 675 cd./m.² which is deviated from dark portion to light portion, with the result that the exposure of the dark portion is underexposed. This means, as a matter of course, that it is necessary to consider not only the ratio of the areas but also that of brightnesses of the light and dark portions of the scene to be photographed to have an appropriate exposure. With respect to a flat body having less contrast as shown in FIG. 5, a conventional exposure meter indicates 3.75 cd./m.², which is substantially appropriate value.

According to the above, it is clear that conventional exposure meters exhibit an appropriate exposure value when the scene to be photographed is flat and of less contrast. When the scene has significant contrast, conventional exposure meters indicate an underexposure setting. Such meters give inadequate indication values with respect to the scene to be photographed having contrast because the exposure meters give only one signal based on the brightest portion of the body.

In accordance with this invention signals based on the light portions of the scene are combined in series with signals based on the dark portion of the scene.

Figure 7:
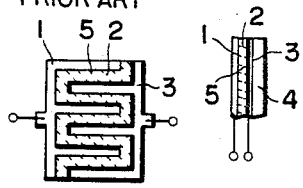
Figure 8:
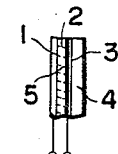

The photoconductive cell of CdS, for example, is constructed as the sintered type shown in FIG. 7 or the film type shown in FIG. 8. In FIG. 7, photoconductive material 2 is interposed as sintered powders between comb-like electrodes 1 and 3, while in FIG. 8, photoconductive material 2 is interposed as films between transparent electrode 1 and electrode 3 fixed on the base plate 4. FIG. 7 shows an elevational view of such sintered type, while FIG. 8 shows a sectional view of such film type. In both cases, it is deemed that electrodes 1 and 3 and an infinite number of photoconductive material elements 2 are surrounded by block line 5 and are connected in parallel. This is diagrammatically shown in FIG. 9, in which A and B are photoconductive material elements and electrodes as shown in FIGS. 7 and 8.

When the image of the scene to be photographed is focussed on the photoconductive surface by image forming means such as a lens, the resistance value of the photoconductive material is lowered at a higher intensity of illumination. And consequently, even when the resistance value is high in photoconductive element B due to the predominance of the dark portion of the image of the scene to be photographed, if there does exist one bright portion in element A, the composite resistance obtained between terminals $a$ and $b$ would be lowered under the influence of element A. This would cause the indication value of the exposure meters of the prior art to be deflected to the bright side.

This invention proposes to place a single photoconductive cell divided into more than two photoconductive elements connected in series in position to have the scene focused thereon. This is diagrammatically shown in FIG. 10. In this arrangement, if there is one dark portion, for example, in element B, the composite resistance between terminals $a$ and $b$ exhibits a high value, thereby the exposure meter of this invention represents an exposure value set on the basis deviated from bright to dark.

Figure 11:
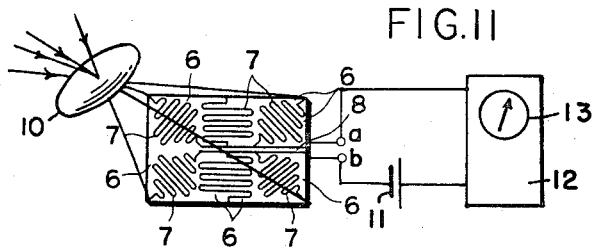
FIG. 11 shows an illustrative embodiment of this invention having six photoconductive elements.

FIG. 11 shows an illustrative embodiment of the invention having six elements or units, in which 6 is the electrode and 7 is the photoconductive material such as, for example, CdS, and each material 7 and electrode 6 are connected in parallel, while each element composed of electrode 6 and material 7 is connected in series to each other which in turn is connected between terminals $a$ and $b$. These elements are cemented to an insulated base plate 8.

Figure 9:
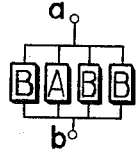
FIG. 9 shows an arrangement of the photoconductive elements according to the prior art.
Figure 10:
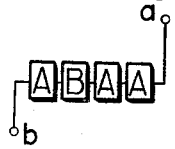
FIG. 10 shows an arrangement of the photoconductive elements embodying this invention.

Referring to FIGS. 9 through 11, a focussing lens 10 forms an image of the scene to be photographed on the photoconductive cell to produce thereon the illumination intensity distribution corresponding to the brightness distribution of every portion of the scene. Electrodes 6 and photoconductive materials 7 are alternately arranged on the plate 8, and the photoconductive elements are connected directly in series. Between terminal $a$ on one end of the series connected elements and terminal $b$ on the other end thereof, a circuit comprising battery 11, exposure calculation mechanism 12 and ammeter 13 is connected to indicate an exposure value on the meter 13.

In each element (for example, in FIG. 10, one element among four elements), a signal on the basis of the brightest portion is derived. However, in putting all elements together, the exposure is made on the basis of the dark portion so that the obtained value exhibits an appropriate value automatically even though the scene to be photographed is of significant contrast.

Figure 4:
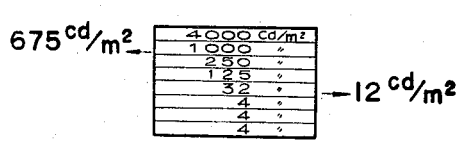
Figure 6:
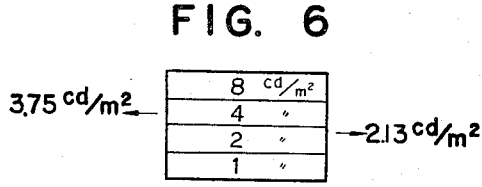

When calculating the indicating values of the exposure according to the present inventive system with respect to the pictures shown in FIGS. 1, 3 and 5 by dividing those pictures into four elements, each of which elements being connected in series (it is assumed that the resistance value of CdS is simply inversely proportional to the brightness for simplifying the calculation), 23 cd./m.$^2$, 12 cd./m.$^2$ and 2.13 cd./m.$^2$ are obtained as shown in the right side of FIGS. 2, 4 and 6, respectively.

It is therefore apparent that the exposure meter provided with the light receiving element according to the present invention exhibits a much more appropriate exposure value with regard to a high contrast scene to be photographed than with conventional exposure meters.

With respect to the flat scene to be photographed, the exposure meter of the present invention exhibits substantially similar exposure values as those obtained by conventional meters. There is thus provided an exposure meter which may be used in photographing scenes of substantial contrast or scenes of very little contrast which automatically corrects the exposure value for the different types of scenes and wherein no settings or corrections are necessary based upon the experience or impressions of the photographer.

What is claimed is:

1. An electrical photometric device comprising, focusing means for forming an image of a scene to be photographed, light sensitive means on which the said image is focused and which is responsive to the light intensity of the image to vary an electrical signal in accordance with the light intensity of the scene, said light sensitive means being provided with a light receiving surface to receive the distribution of light intensity corresponding to the light distribution of every portion of the scene to be photographed, the surface being divided into more than two elements composed of an electrode and photoconductive material, said elements being connected in series to each other, and an electrical circuit comprising a battery and a meter connected to the series connected elements.

2. A device according to claim 1, wherein adjacent series connected electrodes are common to each other except those electrodes on each end serving as terminals.

3. A device according to claim 2, wherein the focusing means comprises a single lens, and the electrodes are comb-like.

References Cited

UNITED STATES PATENTS

| | | | |
|---|---|---|---|
| 1,982,406 | 11/1934 | Tönnies | 88—23 |
| 2,268,105 | 12/1941 | Bing | 88—23 |
| 3,028,499 | 4/1962 | Farrall. | |
| 3,102,227 | 8/1963 | De Gier | 250—209 X |
| 3,282,178 | 11/1966 | Nelson | 88—23 X |

JEWELL H. PEDERSEN, *Primary Examiner.*

W. A. SKLAR, *Assistant Examiner.*